United States Patent
Dalsgaard et al.

(10) Patent No.: US 11,653,316 B2
(45) Date of Patent: May 16, 2023

(54) METHODS AND APPARATUSES FOR USER EQUIPMENT MEASUREMENT PERFORMANCE REQUIREMENT DETERMINATION

(71) Applicant: Nokia Technologies Oy, Espoo (FI)

(72) Inventors: Lars Dalsgaard, Oulu (FI); Li Zhang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/975,378

(22) PCT Filed: Feb. 26, 2018

(86) PCT No.: PCT/CN2018/077276
§ 371 (c)(1),
(2) Date: Aug. 24, 2020

(87) PCT Pub. No.: WO2019/161569
PCT Pub. Date: Aug. 29, 2019

(65) Prior Publication Data
US 2020/0396704 A1 Dec. 17, 2020

(51) Int. Cl.
*H04W 56/00* (2009.01)
*H04W 24/10* (2009.01)
(Continued)

(52) U.S. Cl.
CPC ......... *H04W 56/001* (2013.01); *H04W 24/10* (2013.01); *H04W 72/0453* (2013.01)

(58) Field of Classification Search
None
See application file for complete search history.

(56) References Cited

U.S. PATENT DOCUMENTS

| 5,712,716 A | 1/1998 | Vanoli et al. |
| 2019/0182900 A1* | 6/2019 | Cui ............ H04W 88/06 |

(Continued)

FOREIGN PATENT DOCUMENTS

| CN | 101401055 A | 4/2009 |
| CN | 106559200 A | 4/2017 |

(Continued)

OTHER PUBLICATIONS

Extended European Search Report received for corresponding European Patent Application No. 18907386.9, dated Oct. 21, 2021, 11 pages.

(Continued)

*Primary Examiner* — Saba Tsegaye
(74) *Attorney, Agent, or Firm* — Squire Patton Boggs (US) LLP

(57) ABSTRACT

Systems, methods, apparatuses, and computer program products for determining UE measurement performance in communication systems, such as NR, are provided. One method may include grouping configured carriers according to synchronization signal block measurement timing configuration (SMTC) to form carrier groups, distributing measurement gaps on the configured carriers according to an intra-frequency and inter-frequency gap sharing rule, and distributing the measurement gaps available for inter-frequency measurements among inter-frequency carrier groups according to the carrier groups with non-overlapping synchronization signal block measurement timing configuration (SMTC) or the carrier groups with overlapping synchronization signal block measurement timing configuration (SMTC) to create a distribution of the measurement gaps.

16 Claims, 5 Drawing Sheets

(51) Int. Cl.
*H04W 72/04* (2009.01)
*H04W 72/0453* (2023.01)

(56) References Cited

U.S. PATENT DOCUMENTS

| | | | | |
|---|---|---|---|---|
| 2019/0253906 | A1* | 8/2019 | Lin | H04W 24/10 |
| 2019/0261206 | A1* | 8/2019 | Gheorghiu | H04L 27/2646 |
| 2019/0364452 | A1* | 11/2019 | Hwang | H04W 56/00 |
| 2021/0084511 | A1* | 3/2021 | Harada | H04W 24/08 |

FOREIGN PATENT DOCUMENTS

| | | |
|---|---|---|
| CN | 107278383 A | 10/2017 |
| CN | 107528682 A | 12/2017 |
| WO | 2017/217719 A1 | 12/2017 |

OTHER PUBLICATIONS

"Further discussion on measurement gap sharing", 3GPP TSG-RAN WG4#86, R4-1802395, Agenda : 7.9.3.3, Nokia, Feb. 26-Mar. 2, 2018, 3 pages.
"On measurement of multiple frequency layers with gap", 3GPP TSG-RAN4 Meeting #84bis, R4-1710368, Agenda : 9.7.4.3, Intel Corporation, Oct. 9-13, 2017, pp. 1-3.
"3rd Generation Partnership Project; Technical Specification Group Radio Access Network; NR; Requirements for support of radio resource management (Release 15)", 3GPP TS 38.133, V1.0.0, Dec. 2017, 39 pages.
"LS on Definitions of Intra-frequency and Inter-frequency Measurements", 3GPP RAN WG4 Meeting #84, R4-1709108, RAN4, Aug. 21-25, 2017, 2 pages.
"Multi-layer Measurement with Gaps", 3GPP TSG-RAN WG4#85, R4-1713101, Agenda : 9.7.4.3, Nokia, Nov. 27-Dec. 1, 2017, 3 pages.
"Scaling for Measurements of Multiple Frequency Layers with Gaps", 3GPP TSG-RAN WG4 Meeting #85, R4-1712486, Agenda : 9.7.4.3, Ericsson, Nov. 27-Dec. 1, 2017, pp. 1-4.
International Search Report and Written Opinion received for corresponding Patent Cooperation Treaty Application No. PCT/CN2018/077276, dated Nov. 15, 2018, 10 pages.
Chinese Office Action corresponding to CN Application No. 201880092401.0, dated Aug. 12, 2022.
Huawei et al., "Discussion on SSB based inter-frequency measurement requirements", 3GPP TSG-RAN WG4 Meeting #86, Athens, Greece, Feb. 26-Mar. 2, 2018, R4-1802637, 3 pages.
Chinese Office Action corresponding to CN Application No. 201880092401.0, dated Feb. 24, 2023.

* cited by examiner

US 11,653,316 B2

METHODS AND APPARATUSES FOR USER EQUIPMENT MEASUREMENT PERFORMANCE REQUIREMENT DETERMINATION

RELATED APPLICATION

This application claims priority to PCT Application No. PCT/CN2018/077276, filed on Feb. 26, 2018, of which is incorporated herein by reference in its entirety.

FIELD

Some example embodiments may generally relate to mobile or wireless telecommunication systems. For instance, various example embodiments may relate to user equipment (UE) measurements in such telecommunication systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method, which may include grouping configured carriers according to synchronization signal block measurement timing configuration (SMTC) to form carrier groups, distributing measurement gaps on the configured carriers according to an intra-frequency and inter-frequency gap sharing rule, and distributing the measurement gaps available for inter-frequency measurements among inter-frequency carrier groups according to the carrier groups with non-overlapping synchronization signal block measurement timing configuration (SMTC) or the carrier groups with overlapping synchronization signal block measurement timing configuration (SMTC) to create a distribution of the measurement gaps.

Another embodiment is directed to an apparatus that may include at least one processor and at least one memory comprising computer program code. The at least one memory and computer program code configured, with the at least one processor, to cause the apparatus at least to group configured carriers according to synchronization signal block measurement timing configuration (SMTC) to form carrier groups, distribute measurement gaps on the configured carriers according to an intra-frequency and inter-frequency gap sharing rule, and distribute the measurement gaps available for inter-frequency measurements among inter-frequency carrier groups according to the carrier groups with non-overlapping synchronization signal block measurement timing configuration (SMTC) or the carrier groups with overlapping synchronization signal block measurement timing configuration (SMTC) to create a distribution of the measurement gaps.

Another embodiment is directed to an apparatus that may include means for grouping configured carriers according to synchronization signal block measurement timing configuration (SMTC) to form carrier groups, means for distributing measurement gaps on the configured carriers according to an intra-frequency and inter-frequency gap sharing rule, and means for distributing the measurement gaps available for inter-frequency measurements among inter-frequency carrier groups according to the carrier groups with non-overlapping synchronization signal block measurement timing configuration (SMTC) or the carrier groups with overlapping synchronization signal block measurement timing configuration (SMTC) to create a distribution of the measurement gaps.

Another embodiment is directed to a non-transitory computer readable medium comprising program instructions stored thereon for performing at least the following: grouping configured carriers according to synchronization signal block measurement timing configuration (SMTC) to form carrier groups, distributing measurement gaps on the configured carriers according to an intra-frequency and inter-frequency gap sharing rule, and distributing the measurement gaps available for inter-frequency measurements among inter-frequency carrier groups according to the carrier groups with non-overlapping synchronization signal block measurement timing configuration (SMTC) or the carrier groups with overlapping synchronization signal block measurement timing configuration (SMTC) to create a distribution of the measurement gaps.

Another embodiment is directed to a method that may include grouping carriers having overlapping synchronization signal block measurement timing configuration (SMTC) occasions, and distributing measurement gaps among the grouping of carriers with overlapping synchronization signal block measurement timing configuration (SMTC) occasions. The distributing may include defining N as a ratio of longest synchronization signal block measurement timing configuration (SMTC) period and shortest synchronization signal block measurement timing configuration (SMTC) period among all carriers, F, in a group, and, for each of synchronization signal block measurement timing configuration (SMTC) occasions, determining a share for each carrier.

An apparatus that may include at least one processor and at least one memory comprising computer program code. The at least one memory and computer program code configured, with the at least one processor, to cause the apparatus at least to group carriers having overlapping synchronization signal block measurement timing configuration (SMTC) occasions, and distribute measurement gaps among the grouping of carriers with overlapping synchronization signal block measurement timing configuration (SMTC) occasions. The distributing of the measurement gaps may include to define N as a ratio of longest synchronization signal block measurement timing configuration (SMTC) period and shortest synchronization signal block measurement timing configuration (SMTC) period among all carriers, F, in a group, and, for each of N synchronization signal block measurement timing configuration (SMTC) occasions, to determine a share for each carrier.

Another embodiment is directed to an apparatus that may include means for grouping carriers having overlapping synchronization signal block measurement timing configuration (SMTC) occasions, and means for distributing measurement gaps among the grouping of carriers with overlapping synchronization signal block measurement timing configuration (SMTC) occasions. The means for distributing may include means for defining N as a ratio of longest synchronization signal block measurement timing configuration (SMTC) period and shortest synchronization signal block measurement timing configuration (SMTC) period among all carriers, F, in a group, and, for each of N synchronization signal block measurement timing configuration (SMTC) occasions, means for determining a share for each carrier.

Another embodiment is directed to a non-transitory computer readable medium comprising program instructions stored thereon for performing at least the following: grouping carriers having overlapping synchronization signal block measurement timing configuration (SMTC) occasions, and distributing measurement gaps among the grouping of carriers with overlapping synchronization signal block measurement timing configuration (SMTC) occasions. The distributing may include defining N as a ratio of longest synchronization signal block measurement timing configuration (SMTC) period and shortest synchronization signal block measurement timing configuration (SMTC) period among all carriers, F, in a group, and, for each of N synchronization signal block measurement timing configuration (SMTC) occasions, determining a share for each carrier.

Another embodiment may be directed to a method, which may include receiving, at a user equipment, a synchronization signal block measurement timing configuration (SMTC) for each serving and inter-frequency carrier from a network, wherein the synchronization signal block measurement timing configuration (SMTC) indicates a presence of at least one synchronization signal block on a given carrier in time domain and a periodicity of the at least one synchronization signal block, discontinuously receiving the at least one synchronization signal block in time intervals that are synchronized with measurement gaps, and performing measurements of carriers in the measurement gaps based on the received at least one synchronization signal block.

Another embodiment is directed to an apparatus that may include at least one processor and at least one memory comprising computer program code. The at least one memory and computer program code configured, with the at least one processor, to cause the apparatus at least to receive a synchronization signal block measurement timing configuration (SMTC) for each serving and inter-frequency carrier from a network, wherein the synchronization signal block measurement timing configuration (SMTC) indicates a presence of at least one synchronization signal block on a given carrier in time domain and a periodicity of the at least one synchronization signal block, discontinuously receive the at least one synchronization signal block in time intervals that are synchronized with measurement gaps, and perform measurements of carriers in the measurement gaps based on the received at least one synchronization signal block.

Another embodiment is directed to an apparatus that may include means for receiving a synchronization signal block measurement timing configuration (SMTC) for each serving and inter-frequency carrier from a network, wherein the synchronization signal block measurement timing configuration (SMTC) indicates a presence of at least one synchronization signal block on a given carrier in time domain and a periodicity of the at least one synchronization signal block, means for discontinuously receiving the at least one synchronization signal block in time intervals that are synchronized with measurement gaps, and means for performing measurements of carriers in the measurement gaps based on the received at least one synchronization signal block.

Another embodiment is directed to a non-transitory computer readable medium comprising program instructions stored thereon for performing at least the following: receiving, at a user equipment, a synchronization signal block measurement timing configuration (SMTC) for each serving and inter-frequency carrier from a network, wherein the synchronization signal block measurement timing configuration (SMTC) indicates a presence of at least one synchronization signal block on a given carrier in time domain and a periodicity of the at least one synchronization signal block, discontinuously receiving the at least one synchronization signal block in time intervals that are synchronized with measurement gaps, and performing measurements of carriers in the measurement gaps based on the received at least one synchronization signal block.

BRIEF DESCRIPTION OF THE DRAWINGS

For proper understanding of example embodiments, reference should be made to the accompanying drawings, wherein.

DETAILED DESCRIPTION

Figure 1:
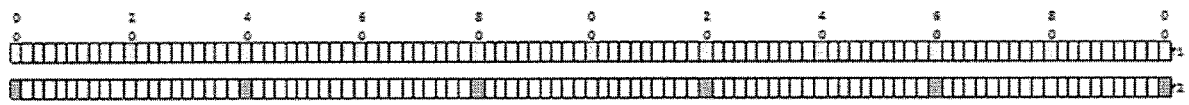
FIG. 1 illustrates an example block diagram of SMTC periodicities, according to certain embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for determining UE measurement performance in communication systems, such as NR, as represented in the attached figures and described below, is not intended to limit the scope of certain embodiments but is representative of selected example embodiments.

The features, structures, or characteristics of example embodiments described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Gap assisted measurement has been applied in both UTRAN and E-UTRAN and is expected to also be applied in NR. Gap assisted measurements are defined to enable UE's, which cannot measure a configured carrier without disrupting the serving carrier(s), to be able to measure the configured carrier at known occasions, thereby enabling measurements without loss of data.

In NR, the approach of gap assisted measurements may also be introduced, as it cannot be assumed that all UEs will be able to measure any configured carrier without gaps. Compared to LTE, handling of measurement gaps in NR will be more challenging due to the use of synchronized transmission of synchronization signals, the synchronization signal (SS)-blocks, and the lack of continuously transmitted reference signals (RSs) for measurements. Having synchronized synchronization signals among the measured carriers, including the serving carrier, leads to new measurement related challenges.

One such challenge is the gap assisted measurements and how to share the gaps among the configured carriers in connected mode.

In NR, the synchronization signal—SS-Block (SSB)—will in most cases not be transmitted in a continuous manner similar to legacy systems. Instead, the SSB may be transmitted in a discontinuous manner. The periodicities for SSB transmission may be 5, 10, 20, 40 80 and 160 ms. The SSB block may be used by the UE for cell detection, as well as SSB-based measurements. This means that the UE is not able to perform cell detection of new identifiable cell and cell measurements on identified cells at other time instances, than when the SSB is present.

The UE may be configured, by the network, with the SSB location information for each configured carrier. This information/configuration is called synchronization signal block measurement timing configuration (SMTC), and informs the UE, e.g., where in time domain the UE can expect the presence of the SSB on a given carrier and its periodicity.

According to certain embodiments, synchronization signal block measurement timing configuration can be, for example, timing configuration for synchronization signal block based measurement or timing configuration for synchronization signal block based radio resource management measurement.

A UE that performs measurements may need measurement gaps to perform such measurements. The $3^{rd}$ generation partnership project (3GPPP) working group RAN4 has defined definitions on intra-frequency and inter-frequency measurements, which for SSB-based measurements states that: a measurement is defined as a SSB based intra-frequency measurement when the center frequency of the SSB of the serving cell and the center frequency of the SSB of the neighbor cell are the same, and the subcarrier spacing of the two SSBs are also the same; and a measurement is defined as a SSB based inter-frequency measurement when the center frequency of the SSB of the serving cell and the center frequency of the SSB of the neighbor cell are different, or the subcarrier spacing of the two SSBs are different. It is noted that these SSB based measurement definitions assume that the same cell transmits just one SSB.

It is observed that there will be gap assisted measurements for both intra-frequency and for inter-frequency. This means that a UE will need measurement gaps for measuring serving and/or neighboring carrier(s).

Due to SSBs being transmitted discontinuously in NR, in order to enable the UEs to measure carriers, the SSBs of the carriers should be transmitted at known time instances. Additionally, for gap-assisted measurements, the measurement gap and the SSB of the measured carrier should be synchronized in time such that a UE can measure the SSB during the measurement gap.

However, a side effect of this design is that SSBs on different carriers (serving and inter-frequency) will need to be synchronized with the measurement gaps. This will also lead to the fact that SSBs of different carriers are likely to overlap and may also overlap with the serving cell SSB. However, the SSB/SMTC periodicity and offset need not necessarily be the same. For example, some carriers may have SMTC periodicity of, for example 20 ms, while other carriers may have an SMTC periodicity of, for example 40 ms, as illustrated in the example of block diagram of FIG. 1.

For NR, two types of measurement gap pattern approaches are to be introduced. The two measurement gap patter approaches are: (1) per UE/Common measurement gap pattern, and (2) per frequency range (FR) measurement gap pattern. Common measurement gap pattern means that a gap is a gap on all serving carriers of the UE, while a per FR gap pattern means that a gap is a gap for serving carriers, for example, on either frequency range 1, FR1 (which includes carriers below 6 GHz) or frequency range 2, FR2 (which includes carriers above 6 GHz) but not across FRs. It should be noted that the 6 GHz border between FRs is what is currently used, but other or additional FR range blocks may also be used.

In view of the above, certain embodiments provide a solution that provides predictable UE performance accounting for all different SMTC locations on different carriers, while not degrading the expected UE performance or unnecessarily limiting the network configuration options. In addition, an embodiment allows for the network to estimate the expected UE performance under different measurement conditions.

For example, some embodiments provide a method to determine the UE measurement performance in NR. An embodiment of the method may account for the various challenges related to measurements as discussed above, and can ensure network configuration flexibility. By applying example embodiments, a predictable scaling of the UE performance requirements may be defined which enables the network to have knowledge of the expected UE minimum performance for a given configuration.

Accordingly, certain embodiments provide a process for determining performance that may include: grouping the configured carriers according to SMTC, distributing the gaps according to intra-frequency and inter-frequency gap sharing rule(s), and distributing the available gaps for inter-frequency measurements among the inter-frequency carrier groups according to groups with non-overlapping SMTC and groups with overlapping SMTC.

In an embodiment, the grouping of the configured carriers may be done according to one or more of the following rules: (1) serving carrier (intra-frequency) is own group; (2) carriers (inter-frequency) that have any overlapping SMTC occasions will be in the same group (independent from the SMTC periodicity); and (3) a carrier (inter-frequency) with no overlapping SMTC occasions with any other inter-frequency carriers will be in its own group.

According to certain embodiments, the measurement performance for the serving cell may be determined by the explicit gap sharing between intra-frequency and inter-frequency measurement gaps, as discussed in more detail below. If a UE has multiple serving carriers, it may be assumed that the UE can measure such carriers in parallel. Otherwise, intra-frequency gaps may be shared among serving carriers. The measurement performance for a carrier with no overlapping SMTC with any other carrier, means that no gap sharing or performance scaling is needed.

Some embodiments may be directed to determining the measurement performance for a group of inter-frequency carriers with full or partially overlapping SMTC. One embodiment may include a process or algorithm that defines how to share the gaps among a group of inter-frequency carriers with full or partial overlapping SMTC, and defines the corresponding measurement requirement for each of them. In certain embodiments, the "share" may refer to one or more of a gap share, a measurement gap share, a share of gaps among a group of carriers, a share of distributed measurement gaps, a share of one of the measurement gaps, a share of gaps among a group of inter-frequency carriers or a share of gaps among configured carriers. Thus, in an embodiment, a process defining the gap sharing and thereby the expected measurement performance for inter-frequency and/or intra-frequency carriers may include:

(1) Denoting N as the ratio of longest SMTC period and shortest SMTC period among all carriers, F, in the group. There will be N SMTC occasions within the longest SMTC period;

(2) For each of the N SMTC occasions, determining the share for each carrier. There may be several options to determine the share for each carrier. For example, as one option, denote $S(f_x, n_y)$ as the share for the $f_x$ carrier ($f_x$ where $1 \le x \le F$) at the $n_y$ SMTC occasion ($n_y$ where $1 \le y \le N$) and, if the $f_x$ carrier does not have SMTC window present at $n_y$ SMTC occasion, $S(f_x, n_y)=0$;

(3) For each of the F carriers, calculating the available gap within the longest SMTC period as $G(f_x)=S(f_x,1)+S(f_x,2)+ \ldots +S(f_x,N)$, where $x \in [1,F]$, which gives $G(f_x)$ as: $G(f_x)=\Sigma_N^{y=1} S(f_x, n_y)$;

(4) Denoting the $p(f_x)$ as the ratio of longest SMTC period and the SMTC period of $f_x$ carrier, the performance of the $f_x$ carrier in the group is $p(f_x)/G(f_x)$.

Figure 2:
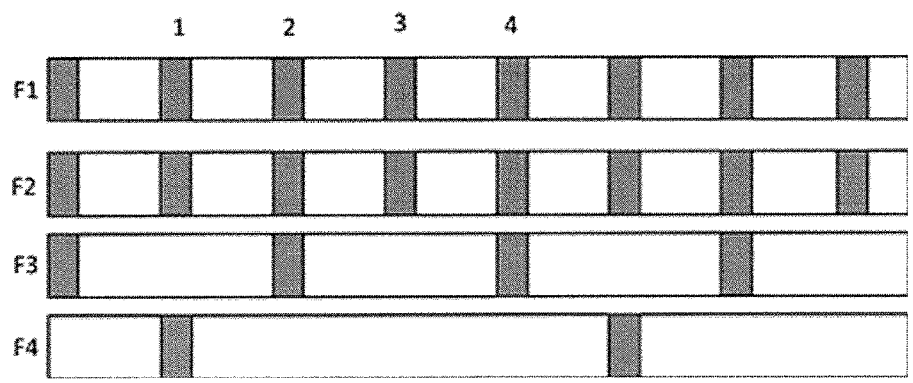
FIG. 2 illustrates an example block diagram depicting several options to determine the share at each SMTC occasion, according to an embodiment.

FIG. 2 illustrates an example block diagram depicting several options to determine the share at each SMTC occasion in step (2) above, according to certain embodiments. In the example of FIG. 2, N equals to 4 and options for SMTC occasion 1 are shown, but examples may also be directly applied to other SMTC occasions 2, 3, 4.

In an embodiment, option 1 provides an equal share. This means that each carrier that has SMTC window present at the occasion will get the same share according to the number of carriers sharing the gap. According to this option in the example of FIG. 2, in SMTC occasion 1, F1 will get 1/3, F2 will get 1/3, and F4 will get 1/3, and S(1,1)=1/3, S(2,1)=1/3, S(3,1)=0, S(4,1)=1/3.

In another embodiment, option 2 provides a proportional share. This means that a carrier with the longer SMTC period will get higher share of the gaps to be shared, and a carrier with shorter SMTC period will get a lower share of the gaps to be shared. According to this option in the example of FIG. 2, in SMTC occasion 1, the SMTC periods of the 3 carriers are F1:F2:F4=1:1:4, so F1 will get 1/6, F2 will get 1/6 and F4 will get 4/6=2/3, and S(1,1)=1/6, S(2,1)=1/6, S(3,1)=0, S(4,1)=2/3.

Alternatively, the gaps may be 100% used for measuring the carrier with longest SMTC period. In case there is more than one carrier with the same longest SMTC period, the gaps may be equally shared among carriers with longest SMTC period. According to this alternative of option 2, in the example of FIG. 2, in SMTC occasion 1, S(1,1)=0, S(2,1)=0, S(3,1)=0, S(4,1)=1. It is noted that "higher share" may refer to more of a share of the gaps, and "lower share" may refer to less of a share of the gaps.

In another embodiment, option 3 provides an inverse proportional share. This means that a carrier with the longer SMTC period will get a lower share, and a carrier with the shorter SMTC period will get a higher share. According to this option in the example of FIG. 2, in SMTC occasion 1, the SMTC periods of the 3 carriers are F1:F2:F4=4:4:1, so F1 will get 4/9, F2 will get 4/9 and F4 will get 4/6=1/9, and S(1,1)=4/9, S(2,1)=4/9, S(3,1)=0, S(4,1)=1/9.

As an example, and because option 2 may provide a more balanced measurement opportunity to all carriers, the approach of option 2 is used as an example below. However, any of the options for sharing a single gap at an SMTC occasion can be integrated according to certain embodiments. One alternative embodiment is that the network may configure a UE with which of the options to used. Alternatively, it may be stated in the specification which option is applied. In an example, following option 2 may result in the following shares:

S(1,1)=1/6, S(2,1)=1/6, S(3,1)=0, S(4,1)=2/3
S(1,2)=1/4, S(2,2)=1/4, S(3,2)=1/2, S(4,2)=0
S(1,3)=1/2, S(2,3)=1/2, S(3,3)=0, S(4,3)=0
S(1,4)=1/4, S(2,4)=1/4, S(3,4)=1/2, S(4,4)=0

When there is a need for gap assistance also for intra-frequency measurements, the sharing of the gaps on a high level between intra-frequency carrier and inter-frequency carrier has been defined in 3GPP WG RAN4 as follows. In particular, it has been defined that, when a UE requires measurement gaps to identify and measure intra-frequency cells or when SMTC configured for intra-frequency measurement are fully overlapping with measurement gaps, and when the UE is configured to identify and measure cells on inter-frequency carriers, then the performance of intra-frequency measurement is scaled by $K_{intra}=1/X*100$, and the performance of inter-frequency measurement is scaled by $K_{inter}=1/(100-X)*100$, where X is a signaled RRC parameter that is to be determined (TBD) and is defined as in Table 1 (which corresponds to Table 9.1.2-5 from 3GPP TS 38.133).

TABLE 1

| Network signaling ParameterName (to be determined by RAN2) | Value of X (%) |
| --- | --- |
| '00' | [TBD] |
| '01' | [TBD] |
| '10' | [TBD] |
| '11' | [TBD] |

As mentioned above, an initial step according to an embodiment may include grouping the configured carriers according to SMTC. According to one embodiment, the serving carrier may be assigned its own group (e.g., it will be assigned a number of gaps according to the Value X in Table 1). This may be used later when distributing the available measurement gaps.

It is noted that, in the following, when referring to a carrier's SMTC, the reference is to a carrier's SMTC which is overlapping/synchronized with a measurement gap (e.g., a carrier may have denser SMTC than a configured measurement gap pattern, but SMTC occasions outside gaps cannot be used for inter-frequency measurement).

Figure 3:
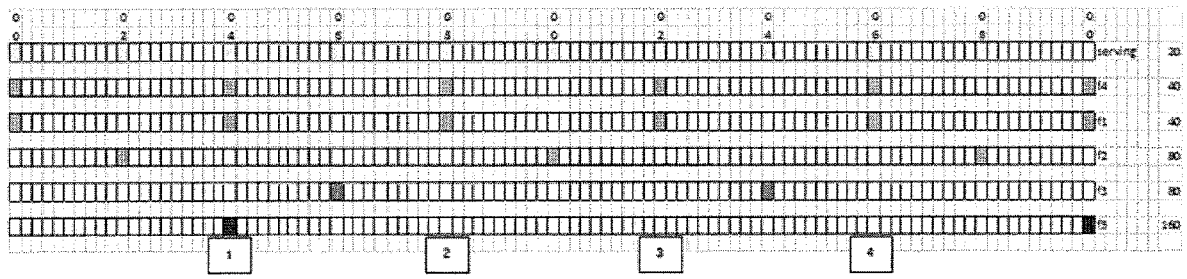
FIG. 3 illustrates a block diagram depicting one example of a carrier grouping, according to an embodiment.

FIG. 3 illustrates a block diagram depicting one example of a carrier grouping, according to an embodiment. In the example of FIG. 3, there are 5 carriers f4, f1, f2, f3, f5, which includes a serving carrier and 5 inter-frequency carriers. An example of the grouping rules may result in the following 4 groups depicted in FIG. 3: Group 1 includes the serving carrier, Group 2 includes carriers f1, f4 and f5, Group 3 includes carrier f2, and Group 4 includes carrier 13. It is noted that, while certain embodiments will be discussed below based on the example of FIG. 3, this is for purposes of illustration and clarity, as FIG. 3 depicts one example embodiment and myriad other examples are available according to other embodiments. As such, example embodiments are not limited to the example of FIG. 3.

Next, in an embodiment, the gaps may be distributed according to intra-frequency and inter-frequency gap sharing. In one example, the available gaps (given by the configured measurement gap pattern) may be distributed among serving and inter-frequency carriers according to Value X in Table 1. For instance, Group 1 is assigned Value X % of the available gaps, and other Groups are assigned (100−Value X) % of the available gaps.

Then, according to certain embodiments, the available gaps may be distributed among the carrier groups. For example, the gaps may be distributed among the groups which do not have any overlapping SMTC occasion with any other carrier. In the example of FIG. 3, this will be Group 1, Group 3 and Group 4. This distribution of gaps will directly result in the given performance requirement for that Group. In this example, the performance of group 1 is given by Max(SMTC period, MGRP)*((1/X)*100), and the performance of group 3 and 4 is given by MAX(SMTC;MRGP)*((1/(100−X))*100), where X is the configured value and SMTC is the SMTC of the carrier.

Additionally, in an embodiment, the available gaps may be distributed among a group of carriers with overlapping SMTCs, for example, by following the 4-step process for defining the gap sharing discussed above (assuming Option 2 using proportional share). In this example, the gaps may be distributed among carriers in the group with overlapping SMTCs. In the example of FIG. 3, it is Group 2. The distribution may reflect the performance of each carrier in the group taking into account the different SMTC of the carriers in the group. The distribution may be done in a manner that reflects and accounts each carrier SMTC.

Applying the process for defining the gap sharing, as in example embodiments, to the example of FIG. 3, results in the longest SMTC period being 160 ms (f5) and the shortest SMTC period being 40 ms (f4 and f1), so N equals to 4. Considering the 160 ms period starting from SMTC occasion N=1, the S-value for each gap may be calculated as follows:

S(4,1)=1/6, S(1,1)=1/6, S(5,1)=2/3,
S(4,2)=1/2, S(1,2)=1/2, S(5,2)=0,
S(4,3)=1/2, S(1,3)=1/2, S(5,3)=0,
S(4,4)=1/2, S(1,4)=1/2, S(5,4)=0.

In this example, for each of the carriers in the group, the G-value may be calculated as follows:
G(4)=1/6+1/2+1/2+1/2=5/3,
G(1)=1/6+1/2+1/2+1/2=5/3,
G(5)=2/3+0+0+0=2/3.

Then, based on the calculated G-values for each carrier, the expected performance for each carrier may be calculated assuming proportional share of the available gaps as follows:
p(4)=160/40=4→Scaling factor is: p(4)/G(4)=12/5,
p(1)=160/40=4→Scaling factor is: p(1)/G(1)=12/5,
p(5)=160/160=1→Scaling factor is: p(5)/G(5)=3/2.

As discussed above, using proportional share as the gap sharing factor/scheme 'S($f_x$,$n_y$)' is just one example, as there may be other options for determining the share, such as equal share or inverse proportional share, for example.

For comparison, Table 2 below provides examples of the scaling factors calculated according to the different sharing options discussed above (i.e., equal sharing according to option 1, proportional sharing according to option 2, and inverse proportional sharing according to option 3) and also from the simplified approach of equal sharing (i.e., prior art in LTE). In one example embodiment, the scaling factors provided by certain embodiments may be understood as referring to the scaling that would be allowed to UE measurement performance for a given carrier, for example, f4 in Table 2, compared to the measurement performance of the same carrier, f4, for the case where only that carrier, f4, was configured. This is just one example relating to f4, as the scaling factors can be applied to any carrier and should not be considered to be limited to examples discussed herein.

TABLE 2

|    | option 1 | option 2 | option 3 | prior art |
|----|----------|----------|----------|-----------|
| f4 | 2.18     | 2.4      | 2.06     | 3         |
| f1 | 2.18     | 2.4      | 2.06     | 3         |
| f5 | 3        | 1.5      | 9        | 3         |

Based on the example of FIG. 3, when assuming X=50%, the whole performance for each of the carriers in the illustrated example may include the following:

Performance of group 1: Max(SMTC period, MGRP)*((1/X)*100)=MAX(20, 40)*2=80 (i.e., performance is scaled by 2 compared to 40 ms SMTC requirements).

Performance of group 3 and 4: MAX(SMTC; MRGP)*((1/(100−X))*100)=Max(80, 40)*2=160 ms (i.e., performance is scaled by 2 compared to 80 ms SMTC requirements).

Performance of group 2:
 (a) Performance of carrier f1 and f4: MAX(SMTC; MRGP)*(scaling if each carrier in group)*((1/(100−X))*100)=40*2.4*2=192 (i.e., performance is scaled by 4.8 compared to 40 ms SMTC requirements).
 (b) Performance of carrier f5: MAX(SMTC;MRGP)*(scaling if each carrier in group)*((1/(100−X))*100)=160*1.5*2=480 (i.e., performance is scaled by 3 compared to 160 ms SMTC requirements).

It is noted that the above-noted example is assuming per UE gap patterns. In the case that per FR gap pattern is used, the method above may applied for each FR. Additionally, the above-noted example is assuming inter-frequency measurement with measurement gap sharing. In the case of the intra-frequency measurement on multiple serving cells without gap but with searcher limit (UE can only measure in parallel 1 or 2 carriers at each SMTC occasion), the method above can also apply.

As another example, the scaling factors may be calculated for each carrier in the example of FIG. 2, in which N equals to 4, and providing the following S-values:

$S(1,1)=1/6$, $S(2,1)=1/6$, $S(3,1)=0$, $S(4,1)=2/3$,
$S(1,2)=1/4$, $S(2,2)=1/4$, $S(3,2)=1/2$, $S(4,2)=0$,
$S(1,3)=1/2$, $S(2,3)=1/2$, $S(3,3)=0$, $S(4,3)=0$,
$S(1,4)=1/4$, $S(2,4)=1/4$, $S(3,4)=1/2$, $S(4,4)=0$.

And providing the following G-values:

$G(1)=1/6+1/4+1/2+1/4=7/6$, $p(1)=160/40=4$, scaling factor is 24/7,
$G(2)=1/6+1/4+1/2+1/4=7/6$, $p(2)=160/40=4$, scaling factor is 24/7,
$G(3)=1/2+1/2=1$, $p(3)=160/80=2$, scaling factor is 2,
$G(4)=2/3+0+0+0=2/3$, $p(4)=160/160=1$, scaling factor is 3/2.

Figure 4A:
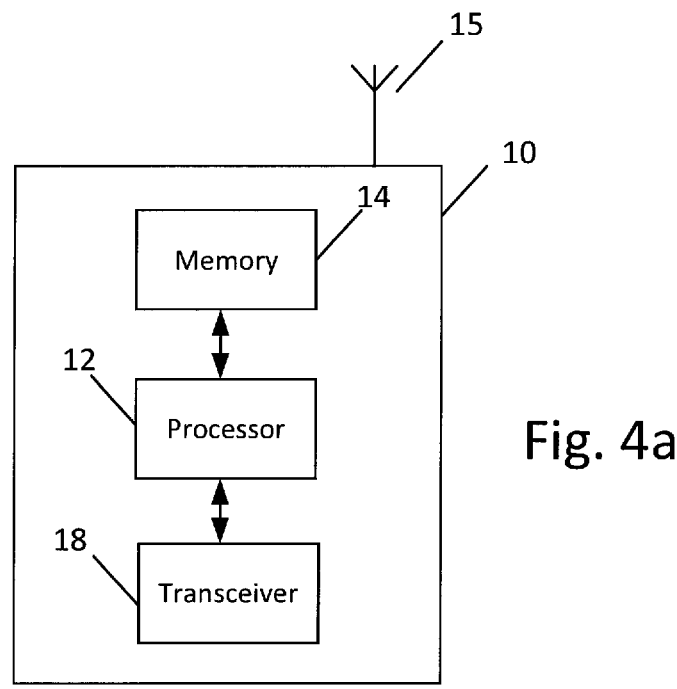
FIG. 4a illustrates an example block diagram of an apparatus, according to one embodiment.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the block diagrams illustrated in FIGS. 1-3. For example, in certain embodiments, apparatus 10 may be configured to perform a procedure that enables UEs to measure carriers in NR and that provides a predictable scaling of UE performance requirements. In an embodiment, apparatus 10 is controlled to perform a process to correctly configure a UE measurement configuration such that the network obtains the UE measurement performance that it seeks or is needed.

According to an embodiment, apparatus 10 may be controlled by memory 14 and processor 12 to group configured carriers in a network according to SMTC to form carrier groups. In one embodiment, apparatus 10 may then be controlled by memory 14 and processor 12 to distribute measurement gaps on the configured carriers according to an intra-frequency and inter-frequency gap sharing rule. In certain embodiments, apparatus 10 may also be controlled by memory 14 and processor 12 to distribute the measurement gaps available for inter-frequency measurements among inter-frequency carrier groups according to the carrier groups with 2o non-overlapping SMTC or the carrier groups with overlapping SMTC in order to create a distribution of the measurement gaps.

In some embodiments, apparatus 10 may be controlled by memory 14 and processor 12 to group the configured carriers by assigning a serving carrier to its own group (e.g., a first group or a first type of group), assigning carriers that have any overlapping SMTC occasions with each other to the same group (e.g., a second group, or second type of group where there may be multiple groups of this second type with carriers having overlapping SMTC occasions), and assigning an inter-frequency carrier that has no overlapping SMTC occasions with any other inter-frequency carriers to its own group (e.g., a third group, or third type of group where there may be multiple groups of this third type with carriers having no overlapping SMTC occasions).

According to certain embodiments, apparatus 10 may be controlled by memory 14 and processor 12 to distribute the available measurement gaps among a group of carriers with overlapping SMTC by performing the following procedure. First, apparatus 10 may be controlled by memory 14 and processor 12 to define N as a ratio of longest SMTC period and shortest SMTC among all carriers, F, in a group. Then, for each of the N synchronization signal block measurement timing configuration (SMTC) occasions, apparatus 10 may be controlled by memory 14 and processor 12 to determine a share for each carrier or, put another way, determine share of gaps among a group of carriers. In an embodiment, for each of the F carriers, apparatus 10 may be controlled by memory 14 and processor 12 to calculate the available gap within the longest synchronization signal block measurement timing configuration (SMTC) period as $G(f_x)=S(f_x,1)+S(f_x,2)+ \ldots +S(f_x,N)$, where $x\in[1;F]$, which gives $G(f_x)$ as:

$$G(f_x)=\Sigma_N{}^{y=1}S(f_x,n_y),$$

where $S(f_x,n_y)$ denotes the share for the $f_x$ carrier at the $n_y$ SMTC occasion. According to one embodiment, apparatus 10 may then be controlled by memory 14 and processor 12 to calculate a performance of the $f_x$ carrier in the group as $p(f_x)/G(f_x)$, where $p(f_x)$ denotes a ratio of the longest synchronization signal block measurement timing configuration (SMTC) period and the synchronization signal block measurement timing configuration (SMTC) period of $f_x$ carrier.

In certain embodiments, apparatus 10 may be controlled by memory 14 and processor 12 to determine the share for each carrier according to at least one of the following: provide an equal share for each carrier, provide a proportional share for each carrier, or provide an inverse proportional share for each carrier. According to certain embodiments, an equal share would provide that each carrier that has a SMTC window present at the occasion gets a same share according to a number of carriers sharing the gap. In certain embodiments, a proportional share would provide that a carrier with a longer SMTC period gets a higher share of the gaps to be shared, and a carrier with a shorter SMTC period gets a lower share of the gaps to be shared. In certain embodiments, an inverse proportional share would provide that a carrier with a longer SMTC period gets a lower share, and a carrier with a shorter SMTC period will get a higher share. In another embodiment, the determination of the share for each carrier may be specified directly in the specification. Accordingly, in certain embodiments, the network (i.e., apparatus 10) may configure or determine whether an equal, proportional or inverse proportional share is provided for each carrier, or this may be pre-specified in the specifications.

According to some embodiments, based on the above-described steps, apparatus 10 may be controlled by memory 14 and processor 12 to determine a measurement performance for the serving carrier based on the gap sharing between intra-frequency and inter-frequency measurement gaps. In other words, based on the grouping of carriers and the procedure for how to distribute the gaps among carriers with overlapping gaps as provided by example embodiments discussed above, apparatus 10 is able to predict the UE measurement performance. As such, the network will know the UE latencies and the UE will know which performance to fulfill.

In one embodiment, apparatus 10 may be further controlled by memory 14 and processor 12 to transmit, to at least one UE, SSB(s) in each cell, where the SSB(s) may be synchronized to the distribution of the measurement gaps, as determined above. According to certain embodiments, apparatus 10 may also be controlled by memory 14 and processor 12 to signal or indicate, to the UE, the SMTC configurations for each serving and inter-frequency carrier, which indicates to the UE the carriers to measure. In addition, in an embodiment, apparatus 10 may be controlled by memory 14 and processor 12 to signal or indicate, to the UE, which type or method of sharing is used for each of the carriers in fully and/or partial overlapping group, such as equal sharing, proportional sharing, and/or inverse proportional sharing, as discussed in detail above. Further, in an embodiment, apparatus 10 may also be controlled by memory 14 and processor 12 to configure the gap sharing between intra- and inter-frequency measurement, i.e., the value of X. As a result, the UE is testable and predictable UE minimum measurement performance is achieved.

Figure 4B:
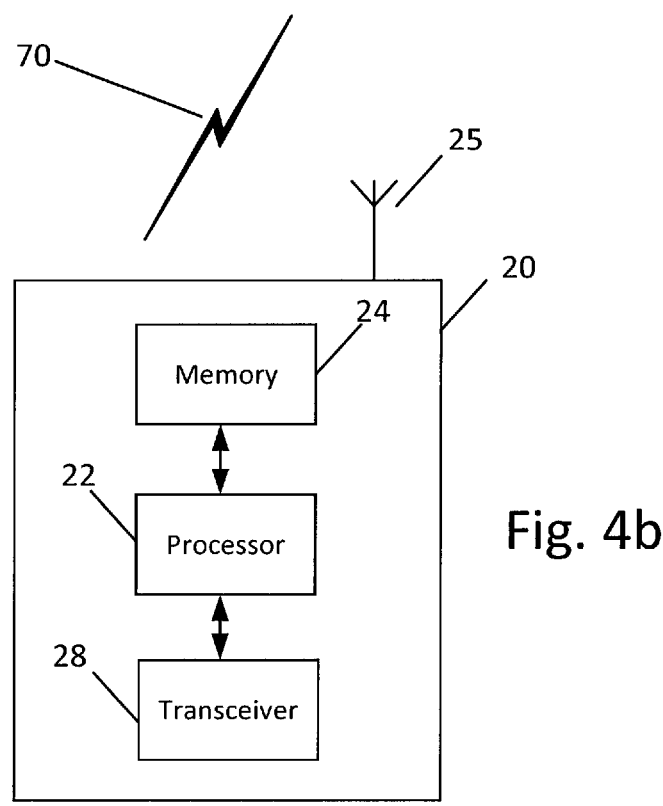
FIG. 4b illustrates an example block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more embodiments described in connection with any figures described herein, such as the block diagrams illustrated in FIGS. 1-3.

According to some embodiments, apparatus 20 may be controlled by memory 24 and processor 22 to receive, from a network node, a SMTC for each serving and inter-frequency carrier. In an embodiment, the received SMTC may indicate a presence of SSB(s) on a given carrier in time domain and a periodicity of the SSB(s). In an embodiment, apparatus 20 may also be controlled by memory 24 and processor 22 to discontinuously receive SSB(s), for example in each cell, which may be used by apparatus 20 for cell detection and SSB-based measurements. In certain embodiments, the SSB(s) may be received in distributed time intervals such that they are synchronized to the distribution of measurement gaps.

In addition, in an embodiment, apparatus 20 may be controlled by memory 24 and processor 22 to receive an indication, from the network node, of which type or method of sharing is used for carriers in fully and/or partial overlapping group, such as equal sharing, proportional sharing, and/or inverse proportional sharing. In some embodiments, apparatus 20 may be controlled by memory 24 and processor 22 to perform the grouping of the carriers according to the received network configurations. According to an embodiment, apparatus 20 may be further controlled by memory 24 and processor 22 to derive the required measurement performance of each carrier based on the received SMTC configuration, and to perform measurements of the carriers in the measurement gaps based on the received SSB(s), e.g., in order to meet the minim measurement performance expected by the network. While it may be left to apparatus 20 to determine how to exactly use the gaps (i.e., which carrier to measure at each gap occasion), apparatus 20 is controlled to meet the derived measurement performance requirements, for example which may regulate the percentage of gaps that apparatus 20 should use for each carrier.

In certain embodiments, apparatus 20 may be further controlled by memory 24 and processor 22 to group configured carriers according to the received SMTC to form carrier groups, to distribute measurement gaps on the configured carriers according to an intra-frequency and inter-frequency gap sharing rule, and to distribute the measurement gaps available for inter-frequency measurements among inter-frequency carrier groups according to the carrier groups with non-overlapping SMTC or the carrier groups with overlapping SMTC to create a distribution of the measurement gaps. In an embodiment, apparatus 20 may be controlled to group the configured carriers by assigning a serving carrier to a first type of group, assigning inter-frequency carriers that have any overlapping SMTC occasions with each other to a second type of group, and assigning any inter-frequency carrier that has no overlapping SMTC occasions with any other inter-frequency carriers to a third type of group.

Figure 5A:
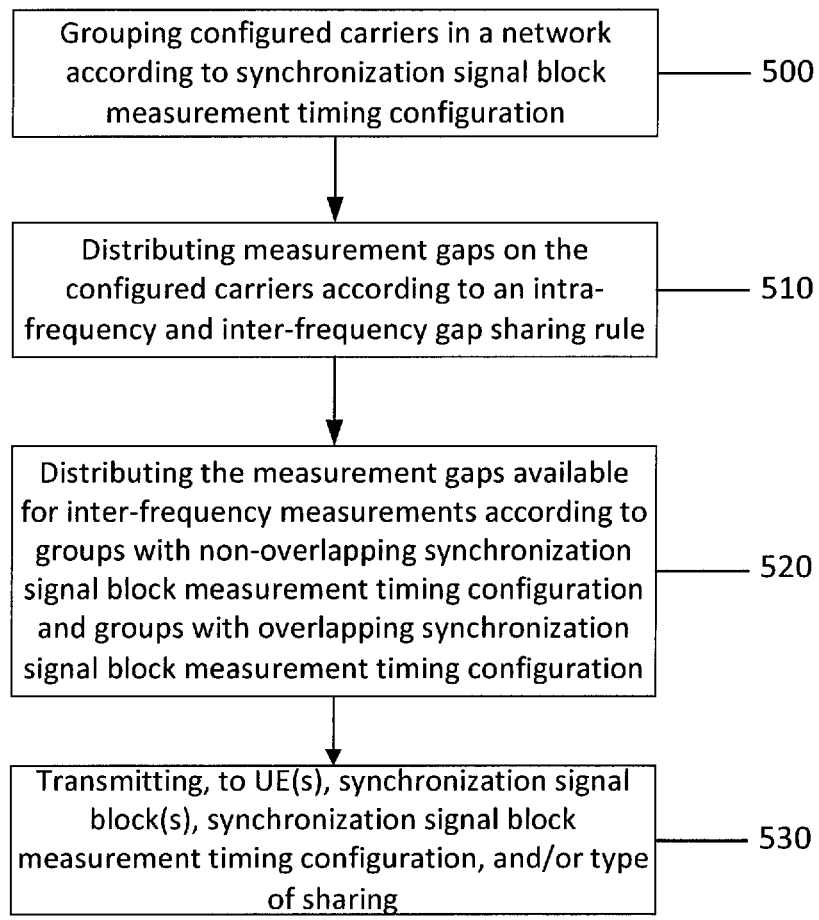
FIG. 5a illustrates an example flow diagram of a method, according to one embodiment.

FIG. 5a illustrates an example flow diagram of a method for measurement performance determination, for example in NR, according to one embodiment. In certain embodiments, the flow diagram of FIG. 5a may be performed by a network node, such as a base station, node B, eNB, gNB, or any other access node. As illustrated in the example of FIG. 5a, the method may include, at 500, grouping configured carriers in a network according to SMTC to form carrier groups, e.g., to achieve a desired measurement performance. In one embodiment, the method may also include, at 510, distributing measurement gaps on the configured carriers according to an intra-frequency and inter-frequency gap sharing rule. In certain embodiments, the method may further include, at 520, distributing the measurement gaps available for inter-frequency measurements among inter-frequency carrier groups according to the carrier groups with non-overlapping SMTC or the carrier groups with overlapping SMTC in order to create a distribution of the measurement gaps.

In some embodiments, the grouping 500 of the configured carriers may include assigning a serving carrier to its own group (e.g., a first group), assigning carriers that have any overlapping SMTC occasions with each other to the same group (e.g., a second group), and assigning an inter-frequency carrier that has no overlapping SMTC occasions with any other inter-frequency carriers to its own group (e.g., a third group).

According to certain embodiments, the distributing 520 of the available measurement gaps among a group of carriers with overlapping SMTC may include performing the following procedure. First, defining N as a ratio of longest SMTC period and shortest SMTC among all carriers, F, in a group. Then, for each of the N synchronization signal block measurement timing configuration (SMTC) occasions, determining a share for each carrier. In an embodiment, for each of the F carriers, calculating the available gap within the longest synchronization signal block measurement timing configuration (SMTC) period as $G(f_x)=S(f_x,1)+S(f_x,2)+ \ldots +S(f_x,N)$, where $x \in [1;F]$, which gives $G(f_x)$ as:

$$G(f_x)=\Sigma_N^{y=1} S(f_x,n_y),$$

where $S(f_x,n_y)$ denotes the share for the $f_x$ carrier at the $n_y$ SMTC occasion. According to one embodiment, the procedure may then include calculating a performance of the $f_x$ carrier in the group as $p(f_x)/G(f_x)$, where $p(f_x)$ denotes a ratio of the longest synchronization signal block measurement timing configuration (SMTC) period and the synchronization signal block measurement timing configuration (SMTC) period of $f_x$ carrier.

In certain embodiments, the determining of the share for each carrier may include at least one of the following: providing an equal share for each carrier, providing a proportional share for each carrier, or providing an inverse proportional share for each carrier. According to an embodiment, the share for each carrier may be specified directly in the specification. Accordingly, in certain embodiments, the network node may configure or determine whether an equal, proportional or inverse proportional share is provided for each carrier, or this may be pre-specified in the specifications.

According to some embodiments, the method may include determining a measurement performance for the serving carrier based on the gap sharing between intra-frequency and inter-frequency measurement gaps. In one embodiment, the method may also include, at 530, transmitting, to one or more UE(s), SSB(s) in each cell, where the SSB(s) may be synchronized to the distribution of the measurement gaps, as determined above. According to an embodiment, the transmitting 530 may also include indicating, to the UE(s), the SMTC configurations for each serving and inter-frequency carrier, which indicates to the UE the carriers to measure. In some embodiments, the transmitting 530 may further include indicating, to the UE(s), which type of sharing is done for carriers in fully and/or partial overlapping group, such as equal sharing, proportional sharing, and/or inverse proportional sharing, as discussed in detail above. As such, example methods may configure the gap sharing between intra- and inter-frequency measurement, i.e., the value of X. As a result, the UE is testable and predictable UE minimum measurement performance is achieved.

Based on the above-described steps, the method of FIG. 5a may determine a measurement performance for the serving carrier based on the gap sharing between intra-frequency and inter-frequency measurement gaps. In other words, based on the grouping of carriers and the procedure for how to distribute the gaps among carriers with overlapping gaps discussed in the foregoing, the method is able to predict the UE measurement performance. Accordingly, the network will know the UE latencies and the UE will know which performance to fulfill.

Figure 5C:
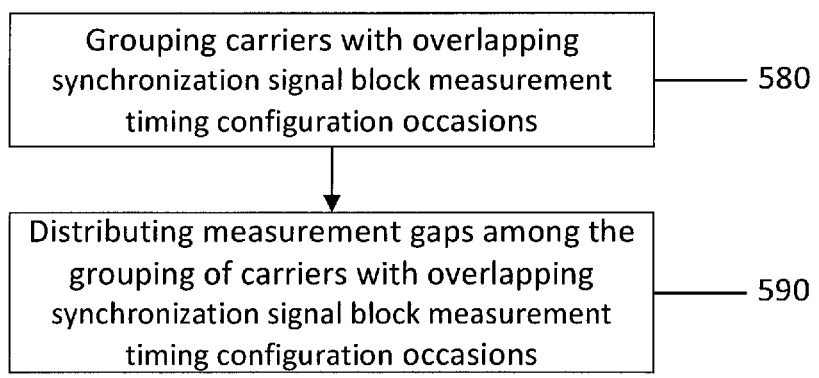
FIG. 5c illustrates an example flow diagram of a method, according to another embodiment.
Figure 5B:
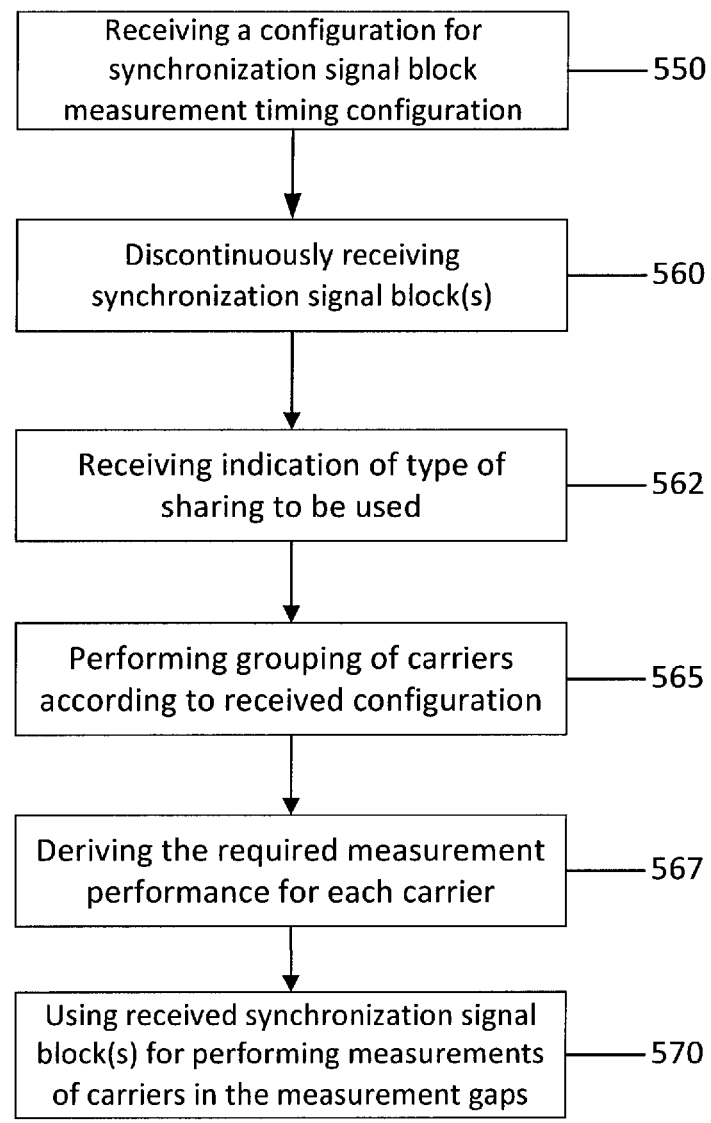
FIG. 5b illustrates an example flow diagram of a method, according to another embodiment.

FIG. 5b illustrates an example flow diagram of a method for UE measurement performance, for example in NR, according to one embodiment. In certain embodiments, the flow diagram of FIG. 5b may be performed, for example, by a UE, mobile station, mobile equipment, IoT device, or the like. As illustrated in the example of FIG. 5b, the method may include, at 550, receiving a SMTC for each serving and inter-frequency carrier. In an embodiment, the received SMTC may indicate a presence of SSB(s) on a given carrier in time domain and a periodicity of the SSB(s). In an embodiment, the method may also include, at 560, discontinuously receiving SSB(s), for example in each cell, that may be used by the UE for cell detection and SSB-based measurements. In certain embodiments, the SSB(s) may be received in distributed time intervals such that they are synchronized with measurement gaps.

In addition, in an embodiment, the method may include, at 562, receiving an indication, from the network, of which type of sharing should be applied for carriers in fully and/or partial overlapping group, such as equal sharing, proportional sharing, and/or inverse proportional sharing. In some embodiments, the method may also include, at 565, performing the grouping of the carriers according to the received network configurations.

According to an embodiment, the method may include, at 567, deriving the required measurement performance of each carrier based on the received SMTC configuration. According to an embodiment, the method may then include, at 570, using received SSB(s) for performing measurements of carriers in the measurement gaps based on the derived measurement performance expected by the network. While it may be left to a UE to determine how to exactly use the gaps (i.e., which carrier to measure at each gap occasion), the method of FIG. 5b results in the UE being able to meet the derived measurement performance requirements, for example which may regulate the percentage of gaps that the UE should use for each carrier.

In one embodiment, the deriving 567 may include grouping configured carriers according to the received SMTC to form carrier groups, distributing measurement gaps on the configured carriers according to an intra-frequency and inter-frequency gap sharing rule, and distributing the measurement gaps available for inter-frequency measurements among inter-frequency carrier groups according to the carrier groups with non-overlapping SMTC or the carrier groups with overlapping SMTC to create a distribution of the measurement gaps. In an embodiment, the grouping of the configured carriers may include assigning a serving carrier to a first type of group, assigning inter-frequency carriers that have any overlapping SMTC occasions with each other to a second type of group, and assigning any inter-frequency carrier that has no overlapping SMTC occasions with any other inter-frequency carriers to a third type of group.

FIG. 5c illustrates an example flow diagram of a method for measurement performance determination, for example in NR, according to one embodiment. In certain embodiments, the flow diagram of FIG. 5c may be performed by a network node, such as a base station, node B, eNB, gNB, or any other access node. As illustrated in the example of FIG. 5c, the method may include, at 580, grouping carriers having overlapping SMTC occasions, and, at 590, distributing measurement gaps among the grouping of carriers with overlapping SMTC occasions. In an embodiment, the distributing 590 includes defining N as a ratio of a longest SMTC period and shortest SMTC period among all carriers, F, in a group, and, for each of N SMTC occasions, determining a share for each carrier. According to one embodiment, the distributing 590 may also include for each of the F carriers, calculating the available gap within the longest SMTC period as $G(f_x)=S(f_x,1)+S(f_x,2)+ \ldots +S(f_x,N)$, where $x \in [1;F]$, which gives $G(f_x)$ as:

$$G(f_x)=\Sigma_N{}^{y=1}S(f_x,n_y),$$

where $S(f_x,n_y)$ denotes the share for the $f_x$ carrier at the $n_y$ SMTC occasion, and calculating a performance of the $f_x$ carrier in the group as $p(f_x)/G(f_x)$, wherein $p(f_x)$ denotes a ratio of the longest SMTC period and the SMTC period of $f_x$ carrier.

Therefore, certain example embodiments provide several technical improvements, enhancements, and/or advantages. Various example embodiments may provide methods for determining the UE measurement performance in a manner that accounts for different SMTC locations on different carriers, while not degrading expected UE performance or unnecessarily limiting network configuration options. Further, certain embodiments are able to be generalized to different situations and options, and are future proof. Example embodiments account for different carriers having different SMTC periodicity and offset, and can take this into account when deciding the final UE performance requirements for each configured carrier. For example, a UE may be allowed a relaxation on each carrier according to the number of gaps and the gap distribution. Additionally, some embodiments make use of all available gaps and ensure that the system is not designed with sub-optimal requirements with unused measurement gaps.

As such, example embodiments can improve performance, latency, and/or throughput of networks and network nodes including, for example, access points, base stations/eNBs/gNBs, and mobile devices or UEs. Accordingly, the use of certain example embodiments result in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

What is claimed is:

1. An apparatus, comprising:
   at least one processor; and
   at least one memory comprising computer program code, the at least one memory and computer program code configured, with the at least one processor, to cause the apparatus at least to:
   receive a synchronization signal block measurement timing configuration for each serving and inter-frequency carrier from a network, wherein the synchronization signal block measurement timing configuration indicates a presence of at least one synchronization signal block on a given carrier in time domain and a periodicity of the at least one synchronization signal block;
   discontinuously receive the at least one synchronization signal block in time intervals that are synchronized with measurement gaps;
   perform measurements of carriers in the measurement gaps based on the received at least one synchronization signal block;
   define N as a ratio of longest synchronization signal block measurement timing configuration period and shortest synchronization signal block measurement timing configuration period among all carriers, F, in a group;
   for each of N synchronization signal block measurement timing configuration occasions, determine a share of gaps among a group of carriers; and
   determine an inverse proportional share for each carrier.

2. The apparatus according to claim 1, wherein the at least one memory and computer program code are further configured, with the at least one processor, to cause the apparatus at least to:
   derive a required measurement performance of each carrier based on the received synchronization signal block measurement timing configuration.

3. The apparatus according to claim 2, wherein the at least one memory and computer program code are further configured, with the at least one processor, to cause the apparatus at least to:
   group configured carriers according to the received synchronization signal block measurement timing configuration to form carrier groups;
   distribute measurement gaps on the configured carriers according to an intra-frequency and inter-frequency gap sharing rule; and
   distribute the measurement gaps available for inter-frequency measurements among inter-frequency carrier groups according to the carrier groups with non-overlapping synchronization signal block measurement timing configuration or the carrier groups with overlapping synchronization signal block measurement timing configuration to create a distribution of the measurement gaps.

4. The apparatus according to claim 3, wherein the at least one memory and computer program code are further configured, with the at least one processor, to cause the apparatus at least to:
   assign a serving carrier to a first type of group;
   assign inter-frequency carriers that have any overlapping synchronization signal block measurement timing configuration occasions with each other to a second type of group; and
   assign any inter-frequency carrier that has no overlapping synchronization signal block measurement timing configuration occasions with any other inter-frequency carriers to a third type of group.

5. The apparatus according to claim 3, wherein the at least one memory and computer program code are further configured, with the at least one processor, to cause the apparatus at least to:
   for each of a plurality of F carriers, calculate the available gap within the longest synchronization signal block measurement timing configuration period as $G(f_x)=S(f_x,1)+S(f_x,2)+\ldots+S(f_x,N)$, where $x \in [1;F]$, which gives $G(f_x)$ as:

$$G(f_x) = \Sigma_N^{y=1} S(f_x, n_y),$$

wherein $S(f_x, ny)$ denotes the share for the $f_x$ carrier at the $ny$ synchronization signal block measurement timing configuration occasion; and calculate a performance scaling of the $f_x$ carrier in the group as $p(f_x)/G(f_x)$, wherein $p(f_x)$ denotes a ratio of a longest synchronization signal block measurement timing configuration period and the synchronization signal block measurement timing configuration period of $f_x$ carrier.

6. The apparatus according to claim 3,
wherein the equal share provides that each carrier that has a synchronization signal block measurement timing configuration window present at the occasion gets a same share according to a number of carriers sharing the gap,
wherein the proportional share provides that a carrier with longer synchronization signal block measurement timing configuration period gets a higher share of the gaps to be shared, and a carrier with a shorter synchronization signal block measurement timing configuration period gets a lower share of the gaps to be shared, and
wherein the inverse proportional share provides that a carrier with a longer synchronization signal block measurement timing configuration period gets a lower share, and a carrier with a shorter synchronization signal block measurement timing configuration period gets a higher share.

7. The apparatus according to claim 1, wherein the at least one memory and computer program code are further configured, with the at least one processor, to cause the apparatus at least to receive an indication, from the network, of which type of sharing should be applied for the carriers in at least one of a fully or partially overlapping carrier group.

8. The apparatus according to claim 7, wherein the type of sharing comprises at least one of equal sharing, proportional sharing, or inverse proportional sharing.

9. An apparatus, comprising:
at least one processor; and
at least one memory comprising computer program code, the at least one memory and computer program code configured, with the at least one processor, to cause the apparatus at least to
group configured carriers according to synchronization signal block measurement timing configuration to form carrier groups;
distribute measurement gaps on the configured carriers according to an intra-frequency and inter-frequency gap sharing rule;
distribute the measurement gaps available for inter-frequency measurements among inter-frequency carrier groups according to the carrier groups with non-overlapping synchronization signal block measurement timing configuration or the carrier groups with overlapping synchronization signal block measurement timing configuration to create a distribution of the measurement gaps;
define N as a ratio of longest synchronization signal block measurement timing configuration period and shortest synchronization signal block measurement timing configuration among all carriers, F, in a group;
for each of N synchronization signal block measurement timing configuration occasions, determine a share of gaps among a group of carriers; and
determine an inverse proportional share for each carrier.

10. The apparatus according to claim 9, wherein the at least one memory and computer program code are further configured, with the at least one processor, to cause the apparatus at least to:
assign a serving carrier to a first group;
assign carriers that have overlapping synchronization signal block measurement timing configuration occasions with each other to a second group; and
assign an inter-frequency carrier that has no overlapping synchronization signal block measurement timing configuration occasions with other inter-frequency carriers to a third group.

11. The apparatus according to claim 9, wherein the equal share provides that each carrier that has a synchronization signal block measurement timing configuration window present at the occasion gets a same share according to a number of carriers sharing the gap,
wherein the proportional share provides that a carrier with longer synchronization signal block measurement timing configuration period gets a higher share of the gaps to be shared, and a carrier with a shorter synchronization signal block measurement timing configuration period gets a lower share of the gaps to be shared, and
wherein the inverse proportional share provides that a carrier with a longer synchronization signal block measurement timing configuration period gets a lower share, and a carrier with a shorter synchronization signal block measurement timing configuration period gets a higher share.

12. The apparatus according to claim 9, wherein the at least one memory and computer program code are further configured, with the at least one processor, to cause the apparatus at least to determine measurement performance for the serving carrier by the gap sharing between intra-frequency and inter-frequency measurement gaps.

13. The apparatus according to claim 9, wherein the at least one memory and computer program code are further configured, with the at least one processor, to cause the apparatus at least to signal, to at least one user equipment, the method used for determining the share for each carrier.

14. A method, comprising:
receiving, at a user equipment, a synchronization signal block measurement timing configuration for each serving and inter-frequency carrier from a network, wherein the synchronization signal block measurement timing configuration indicates a presence of at least one synchronization signal block on a given carrier in time domain and a periodicity of the at least one synchronization signal block;
discontinuously receiving the at least one synchronization signal block in time intervals that are synchronized with measurement gaps;
performing measurements of carriers in the measurement gaps based on the received at least one synchronization signal block;
defining N as a ratio of longest synchronization signal block measurement timing configuration period and shortest synchronization signal block measurement timing configuration period among all carriers, F, in a group;
for each of N synchronization signal block measurement timing configuration occasions, determining a share of gaps among a group of carriers; and
determining an inverse proportional share for each carrier.

15. The method according to claim 14, further comprising:
deriving a required measurement performance of each carrier based on the received synchronization signal block measurement timing configuration.

16. The method according to claim 14, further comprising receiving an indication, from the network, of which type of sharing should be applied for the carriers in at least one of a fully or partially overlapping carrier group.

\* \* \* \* \*